No. 861,223. PATENTED JULY 23, 1907.
G. W. NYE.
DRAFT RIGGING FOR CARS.
APPLICATION FILED FEB. 7, 1907.
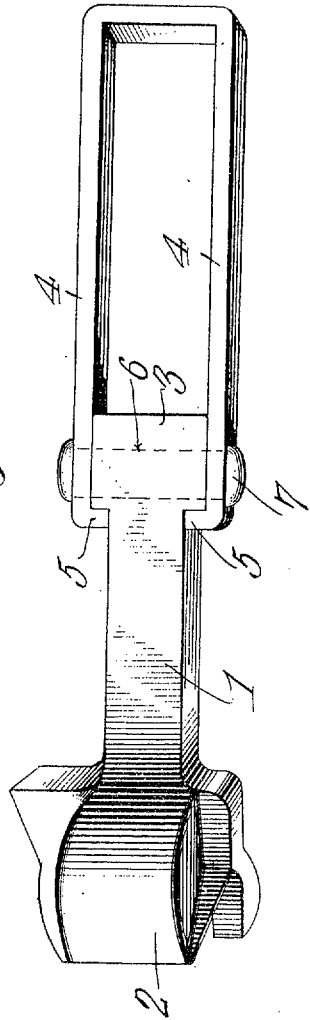
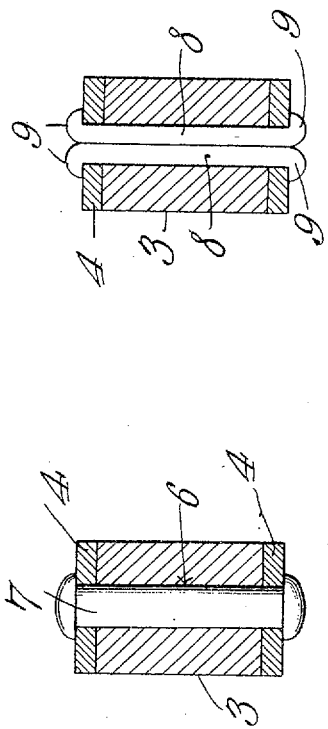
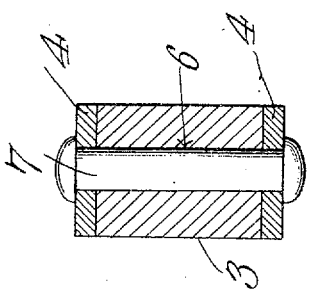
WITNESSES:
George W. Nye, INVENTOR.
By C. A. Snow & Co.
ATTORNEYS

UNITED STATES PATENT OFFICE.

GEORGE WASHINGTON NYE, OF HATTIESBURG, MISSISSIPPI, ASSIGNOR TO VIRGIL E. HOBGOOD AND JOHN N. BASKIN, OF HATTIESBURG, MISSISSIPPI.

DRAFT-RIGGING FOR CARS.

No. 861,223.      Specification of Letters Patent.      Patented July 23, 1907.

Application filed February 7, 1907. Serial No. 356,208.

*To all whom it may concern:*

Be it known that I, GEORGE WASHINGTON NYE, a citizen of the United States, residing at Hattiesburg, in the county of Perry and State of Mississippi, have invented a new and useful Draft-Rigging for Cars, of which the following is a specification.

This invention has reference to improvements in draft rigging for cars, and its object is to provide a means whereby the objections to the connection usually employed between the coupler bar and the yoke carrying the buffer springs are avoided.

It is the common practice to connect the coupler bar to the yoke by means of rivets or bolts, but it is found that under the heavy usage to which such structures are put these rivets or bolts are liable to shear off and the couplers are thereby pulled out from the yoke and, falling upon the tracks, become a menace to the trains. In order to prevent play or looseness between the coupler bar and yoke it is also customary to use two or more spaced bolts or rivets to prevent displacement laterally which might occur if but one bolt were used, and, in addition thereto, providing a stronger structure.

Now, by my invention I avoid the shearing of the rivets and also produce a rigid connection between the coupler bar and yoke by forming in the rear end of the coupler a slot extending laterally through the coupler and the head formed at its rear end, the longer diameter of the slot lying in the plane of the length of the coupler and yoke. Through this slot I pass a rivet fitting the same, the said rivet being of comparatively small thickness, say about the thickness of an ordinary rivet or bolt heretofore used and of a length sufficient to fill a slot as long as a space which would include both the spaced rivets heretofore used. This elongated rivet is headed at each end like an ordinary rivet and thereby constitutes a firm unyielding connection between the coupler and yoke and one which presents such resistance to shearing action that no pull to which the coupler is subjected in practice will be sufficient to pull the coupler bar away from the yoke by cutting or shearing off the rivets. All this will be made clear from the following detailed description taken in connection with the accompanying drawings forming part of this specification, in which, Figure 1 is a perspective view of a coupler and yoke connected thereto in accordance with my invention; Fig. 2 is a cross section through the connection; and Fig. 3 is a cross section through the connection showing another form thereof.

Referring to the drawings, there is shown a coupler shank 1, which may be of the usual or any approved construction, having the ordinary coupling head 2 at one end and formed into a cross-head 3 of T-shape at the other or rear end. Embracing the cross-head 3 are the two side arms 4—4 of a U-shaped yoke, the front ends of which are inturned as shown at 5, to engage the cross-head 3, and these arms extend toward each other sufficiently to meet the bar 1 adjacent to the said cross-head 3. Extending laterally through the cross-head 3 is a slot 6, elongated in the direction of the length of the coupler 1 to an extent about equal to the space usually occupied by two spaced bolts or rivets such as are ordinarily used. Passing through this slot and through corresponding matching slots in the front ends of the yoke arms 4—4 is a flat elongated rivet 7 fitting the slot 6 snugly. This rivet is headed at each end and constitutes the connection between the coupler and the yoke. It will be seen that any force which would be sufficient to shear off a bolt or rivet of the ordinary circular shape in cross section, or even two rivets or bolts placed side by side and spaced apart, would be insufficient to affect the elongated rivet just described. By heading this elongated rivet or key at each end, the yoke and coupler are firmly secured together against any possibility of becoming disconnected, either by the shearing action due to a heavy pull exerted on the coupler or to the parts becoming loosened or lost, as might occur when bolts or pins are used as the fastening means.

Instead of using an elongated rivet of sufficient thickness to occupy snugly the slot formed through the coupler bar head and yoke sides, I may use two thin plates 8—8 of tough steel of such thickness that, inserted side by side in the slot, they will just fill the same, and of such width as to fill the slot in the direction of the length of the coupler. These two plates are made of such length as to project beyond the sides 4 of the yoke through the slots formed therein, and these projecting ends 9 are turned over in opposite directions to engage the faces of the yoke arms 4—4. These two plates form an exceedingly simple and, at the same time, very efficient form of rivet or connecting means for the coupler and yoke, since they may be headed over without the use of any special heading tools. In this last-described form of the invention the connection is as efficient as the single riveted key form shown in Figs. 1 and 2 and has the advantage that it may be applied without the necessity of skilled labor to head the rivets and without the necessity of heading the rivets or using any special heading tools such as are required when it is desired to make a finished job with headed rivets. With this last-described form of connection the shearing action which may occur between the coupler and yoke is as effectually resisted as in the form shown in Figs. 1 and 2, and, in fact, especially tough grades of steel, well adapted to resist the shearing action, may be used in this twin form of rivet connection.

I may add that in practice the key or elongated rivet will be about one inch or more in thickness and about three and three-quarters inches or more in width, and the twin key will be made of plates half the thickness of the solid key.

I claim:—

1. In a draft rigging for cars, a coupler bar having on its rear end a slot extending laterally therethrough, elongated in the plane of the length of the coupler bar, a yoke embracing said rear end and having matching slots, and a twin key passing through the slots, elongated in the plane of the length of the coupler bar and having its ends projecting beyond the sides of the yoke and turned over into engagement therewith on opposite sides of the slot.

2. In a draft rigging for cars, a coupler bar having a laterally extended head formed at its rear end, a yoke embracing said head and having its front ends inturned around said head, and a key or rivet elongated in the direction of the plane of the length of the coupler bar and seated in an elongated slot in the head formed on the rear end of the coupler bar and in matching slots formed in the yoke where it embraces the coupler bar, the said key or rivet being upset or headed at each end in the direction of the plane of the length of the coupler bar to confine the yoke to the coupler bar.

3. In a draft rigging for cars, a coupler bar provided with a head at its rear end, a yoke embracing said head and having its ends inturned around said head, and a key or rivet for confining the head and yoke together comprising two plates seated in a slot formed in the head at the rear end of the coupler bar and the yoke in contact therewith and elongated in the plane of the length of the coupler bar, the said plates filling the said slot in the direction of the plane of the length of the coupler bar and extending laterally beyond the slot and being there upset to embrace the sides of the yoke and confine the same against the head formed on the rear of the coupler bar.

In testimony that I claim the foregoing as my own, I have hereto affixed my signature in the presence of two witnesses.

GEORGE WASHINGTON NYE.

Witnesses:
R. M. BOLDRIDGE,
S. H. GEORGE.